United States Patent
Kim et al.

(10) Patent No.: US 11,894,750 B2
(45) Date of Patent: Feb. 6, 2024

(54) MOTOR

(71) Applicant: LG Magna e-Powertrain Co., Ltd., Incheon (KR)

(72) Inventors: Jongsu Kim, Seoul (KR); Jungwook Moon, Seoul (KR); Changhum Jo, Seoul (KR); Minjung Kim, Seoul (KR); Taehee Kwak, Seoul (KR)

(73) Assignee: LG Magna e-Powertrain Co., Ltd., Incheon (KR)

( * ) Notice: Subject to any disclaimer, the term of this patent is extended or adjusted under 35 U.S.C. 154(b) by 298 days.

(21) Appl. No.: 17/421,230

(22) PCT Filed: Jan. 7, 2020

(86) PCT No.: PCT/KR2020/000221
§ 371 (c)(1),
(2) Date: Jul. 7, 2021

(87) PCT Pub. No.: WO2020/145603
PCT Pub. Date: Jul. 16, 2020

(65) Prior Publication Data
US 2022/0069664 A1    Mar. 3, 2022

(30) Foreign Application Priority Data
Jan. 7, 2019  (KR) .......................... 10-2019-0001819

(51) Int. Cl.
*H02K 5/20*  (2006.01)
*H02K 5/15*  (2006.01)
(Continued)

(52) U.S. Cl.
CPC ............... *H02K 5/203* (2021.01); *H02K 5/15* (2013.01); *H02K 9/19* (2013.01); *H02K 9/193* (2013.01)

(58) Field of Classification Search
CPC  H02K 5/203; H02K 5/15; H02K 9/02; H02K 9/193; H02K 9/19
(Continued)

(56) References Cited

U.S. PATENT DOCUMENTS 6,897,581 B2 * 5/2005 Doherty ................. H02K 19/38
310/59
7,952,240 B2 * 5/2011 Takenaka ................. H02K 1/20
310/58
(Continued)

FOREIGN PATENT DOCUMENTS

CN     102197572     9/2011
CN     102959838     3/2013
(Continued)

OTHER PUBLICATIONS

Extended European Search Report in European Appln. No. 20738398.5, dated Sep. 16, 2022, 8 pages.
(Continued)

*Primary Examiner* — Alex W Mok
(74) *Attorney, Agent, or Firm* — Fish & Richardson P.C.

(57) ABSTRACT

The present invention relates to a motor comprising: a motor housing; a stator which is provided in the motor housing and has a coil; a rotor installed in the stator to be rotatable about a rotary shaft; and a spray hole which is formed in the circumferential surface of the rotor by passing through the circumferential surface in a radial direction and which sprays a cooling fluid in the motor housing onto the coil according to the rotation of the rotor. Therefore, cooling by oil convection can be accelerated while minimizing resistance due to the oil.

12 Claims, 9 Drawing Sheets

(51) Int. Cl.
  *H02K 9/193* (2006.01)
  *H02K 9/19* (2006.01)

(58) Field of Classification Search
  USPC .......................................................... 310/54
  See application file for complete search history.

(56) References Cited

U.S. PATENT DOCUMENTS

| | | | | |
|---|---|---|---|---|
| 8,242,645 | B2* | 8/2012 | Tatematsu | H02K 1/32 310/52 |
| 9,030,062 | B2* | 5/2015 | Matsumoto | H02K 1/32 310/58 |
| 9,154,006 | B2* | 10/2015 | Yamamoto | H02K 1/2766 |
| 2009/0121562 | A1* | 5/2009 | Yim | H02K 9/193 903/906 |
| 2009/0184592 | A1* | 7/2009 | Sano | H02K 9/19 310/90 |
| 2010/0194220 | A1* | 8/2010 | Tatematsu | H02K 1/32 310/61 |
| 2011/0169353 | A1* | 7/2011 | Endo | H02K 1/32 310/59 |
| 2012/0025642 | A1* | 2/2012 | Onimaru | H02K 1/32 310/64 |
| 2012/0049667 | A1 | 3/2012 | Iwase et al. | |
| 2012/0299404 | A1 | 11/2012 | Yamamoto et al. | |
| 2013/0334912 | A1* | 12/2013 | Tokunaga | H02K 9/19 310/54 |
| 2014/0015354 | A1 | 1/2014 | Satou et al. | |
| 2016/0149450 | A1* | 5/2016 | Horii | H02K 1/32 310/54 |
| 2017/0012501 | A1 | 1/2017 | Sano et al. | |
| 2018/0115220 | A1* | 4/2018 | Hayashi | H02K 21/14 |
| 2020/0204044 | A1 | 6/2020 | Lee et al. | |

FOREIGN PATENT DOCUMENTS

| | | |
|---|---|---|
| CN | 103620918 | 3/2014 |
| CN | 104617709 | 5/2015 |
| EP | 3331134 | 6/2018 |
| JP | 2009296772 | 12/2009 |
| JP | 2014225969 | 12/2014 |
| JP | 2015231266 | 12/2015 |
| JP | 2016135066 | 7/2016 |
| KR | 100828799 | 5/2008 |
| KR | 1020180027556 | 3/2018 |
| WO | WO2015145597 | 10/2015 |

OTHER PUBLICATIONS

Office Action in Chinese Appln. No. 202080008126.7, dated Jun. 27, 2023, 28 pages (with English translation).

KR Notice of Allowance in Korean Appln. No. 10-2019-0001819, dated Mar. 18, 2020, 6 pages (with English translation).

KR Office Action in Korean Appln. No. 10-2019-0001819, dated Sep. 2, 2019, 13 pages (with English translation).

* cited by examiner

MOTOR

CROSS-REFERENCE TO RELATED APPLICATIONS

This application is a National Stage application under 35 U.S.C. § 371 of International Application No. PCT/KR2020/000221, filed on Jan. 7, 2020, which claims the benefit of Korean Application No. 10-2019-0001819, filed on Jan. 7, 2019. The disclosures of the prior applications are incorporated by reference in their entirety.

TECHNICAL FIELD

The present disclosure relates to an electric motor capable of accelerating convection cooling of oil.

BACKGROUND ART

Recently, electric vehicles (including hybrid vehicles) having electric motors as driving source for driving vehicles are being released as future vehicles by virtue of excellent fuel efficiency.

In general, an electric motor (or motor) includes a rotor and a stator, and the rotor may be rotatably provided inside the stator.

The stator has a stator coil wound around a stator core. When current flows in the stator coil to rotate the rotor, heat is generated in the stator coil. Thus, technologies are being developed to cool down heat generated in the electric motor.

As for the electric motor used in the electric vehicle, cooling of heat generated in the electric motor plays an important role in achieving a high-powered, smaller, and more efficient electric motor.

In the related art motor cooling methods, an indirect cooling method in which cooling water is circulated inside a housing to indirectly cool down a motor, and a direct cooling method in which oil is sprayed onto a stator or a rotor to directly cool down a motor are employed.

The direct cooling method has high cooling efficiency and cooling performance, compared to the indirect cooling method. Thus, research and development on the direct cooling method have been actively carried out recently.

Prior Art Patent Literature Korean Registration Patent Publication No. 10-0828799 (published on May 9, 2008) discloses an oil cooling structure for a motor and a generator of a hybrid vehicle.

The prior art patent literature discloses an oil cooling structure for a motor and a generator of a hybrid vehicle, in which a plurality of spatulas is integrally attached on an outer circumferential surface of a rotor at one side or both sides of the rotor to scoop up oil so as to be splashed around.

However, since the spatulas of the prior art patent literature are immersed in oil during rotation of the rotor to receive resistance by the oil, rotational force of the motor is reduced and motor efficiency is lowered, thereby causing side effects such as noise and the like.

DISCLOSURE

Technical Problem

The present disclosure has been invented to solve those problems and other drawbacks of the related art, and an aspect of the present disclosure is to provide a motor capable of accelerating cooling by convection of oil while minimizing resistance due to the oil.

Technical Solution

In order to achieve the above aspect and other advantages according to an implementation of the present disclosure, there is provided a motor which may include a motor housing, a stator provided inside the motor housing and having a coil, a rotor mounted in the stator to be rotatable centering on a rotary shaft, and a plurality of spray holes formed through a circumferential surface of the rotor in a radial direction to spray a cooling fluid in the motor housing onto the coil in response to rotation of the rotor.

According to one implementation disclosed herein, the cooling fluid may be oil or air. According to one implementation disclosed herein, the rotor may include a rotor core, a plurality of end plates mounted to both ends of the rotor core in an axial direction, and ribs each having the plurality of spray holes and extending along outer circumferential surfaces of the plurality of end plates, respectively.

According to one implementation disclosed herein, the plurality of spray holes may be formed through the respective ribs in a thickness direction.

According to one implementation disclosed herein, each of the plurality of end plates may further include a cooling fluid accommodating portion formed at an inner side of the rib in a radial direction to communicate with the spray holes.

According to one implementation disclosed herein, the motor may further include a plurality of end covers disposed on both ends of the motor housing to cover the both ends of the motor housing, and the cooling fluid accommodating portions may extend in a circumferential direction of the end plates and be opened toward the end covers in the axial direction, respectively.

According to one implementation disclosed herein, the cooling fluid may be sprayed onto an inner side of the coil from an outer circumferential surface of the rotor through the plurality of spray holes.

According to one implementation disclosed herein, the plurality of spray holes may be formed in a circular shape or an elliptical shape.

According to one implementation disclosed herein, the plurality of spray holes may be spaced apart from one another at both end portions of a circumferential surface of the rotor in a circumferential direction.

According to another implementation disclosed herein, each of the plurality of spray holes may extend in the circumferential direction to be longer than a width.

According to another implementation disclosed herein, the plurality of spray holes may extend long in an oblique direction.

According to one implementation disclosed herein, the motor may further include an oil flow path formed inside the motor housing, and an oil outlet formed in an upper portion of the motor housing in a thickness direction and having both ends communicating with the oil flow path and the inner space of the motor housing, respectively, such that oil is supplied to the coil.

Advantageous Effects

Hereinafter, effects of a motor according to the present disclosure will be described.

First, an end plate may be mounted to each of both end portions of a rotor core, and a rib extending from an outer circumferential surface of the end plate in a circumferential direction may have a shorter protrusion length in an axial direction than a cooling fluid accommodating portion. Accordingly, oil which is dropped from an upper portion of a radially inner side of a coil down onto an outer circumferential surface of the end plate can be guided to be introduced into the cooling fluid accommodating portion and kept in the cooling fluid accommodating portion.

Second, a plurality of spray holes formed through each rib may accommodate oil in a state immersed in the oil stored in a lower portion of a motor housing and pump the accommodated oil into an upper portion of the motor housing as rotating in response to rotation of a rotor, such that the oil can be sprayed onto a coil from an upper portion of the end plate through the spray holes by a centrifugal force.

Third, a plurality of spray holes may spray oil, which is introduced into the spray holes or a cooling fluid accommodating portion during rotation of a rotor, onto an inner surface of the coil by a centrifugal force, thereby cooling the inner surface of the coil.

Fourth, each of ribs formed on an outer circumferential surface of a rotor may be provided with a plurality of spray holes formed through a circumferential surface, so as to generate a flow that oil stored in a motor housing is pumped from lower portion to upper portion of the motor housing, thereby facilitating convection cooling of the oil.

Fifth, each rib extending from an outer circumferential surface of an end plate in a circumferential direction, a plurality of spray holes formed through the rib in a radial direction, and a cooling fluid accommodating portion formed concavely in an outer surface of the end plate along the circumferential direction can minimize flow resistance due to oil even when such components rotate in a state immersed in the oil during rotation of a rotor.

DETAILED DESCRIPTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
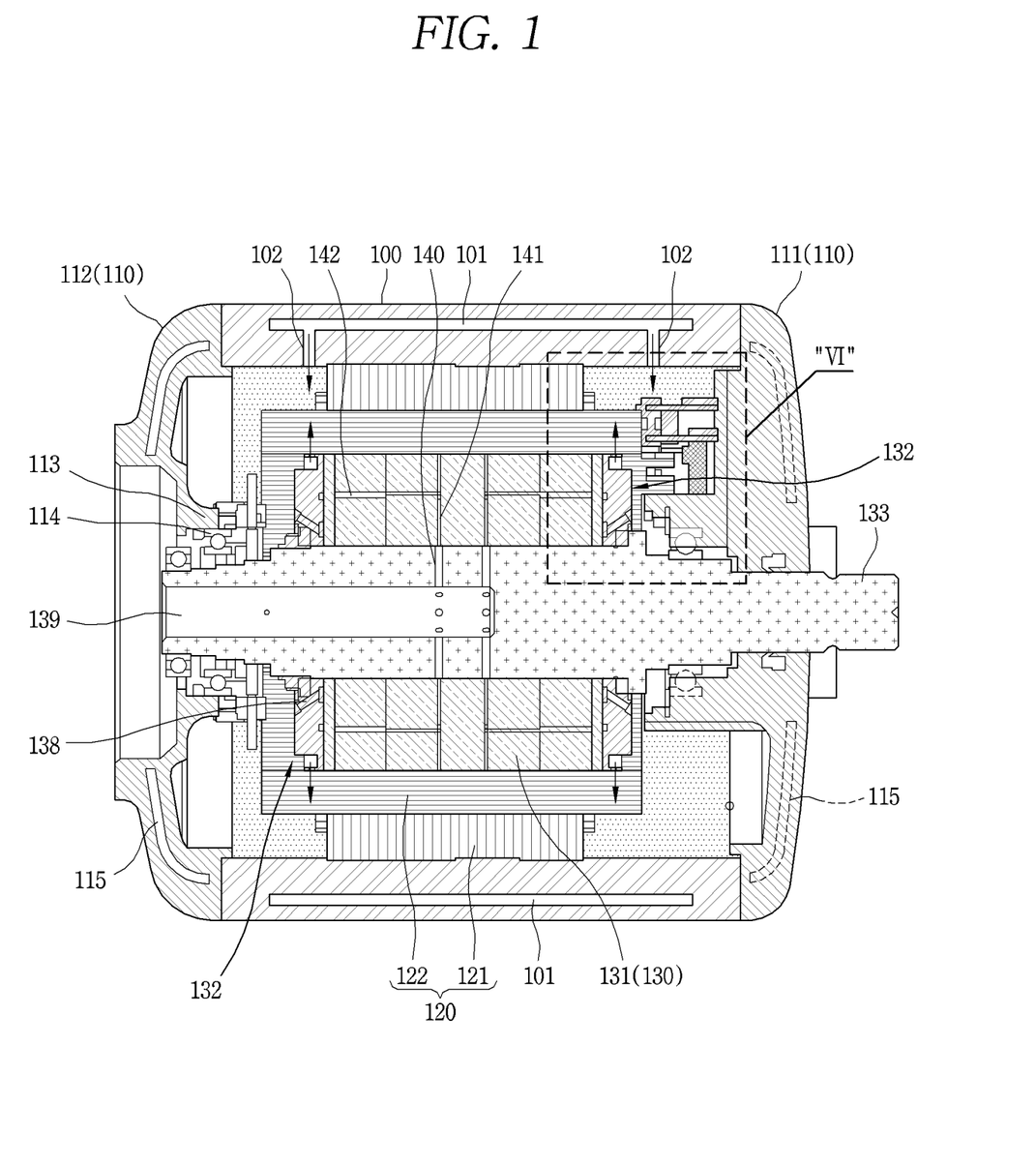
FIG. 1 is a conceptual view of an electric motor in accordance with the present disclosure.
Figure 2:
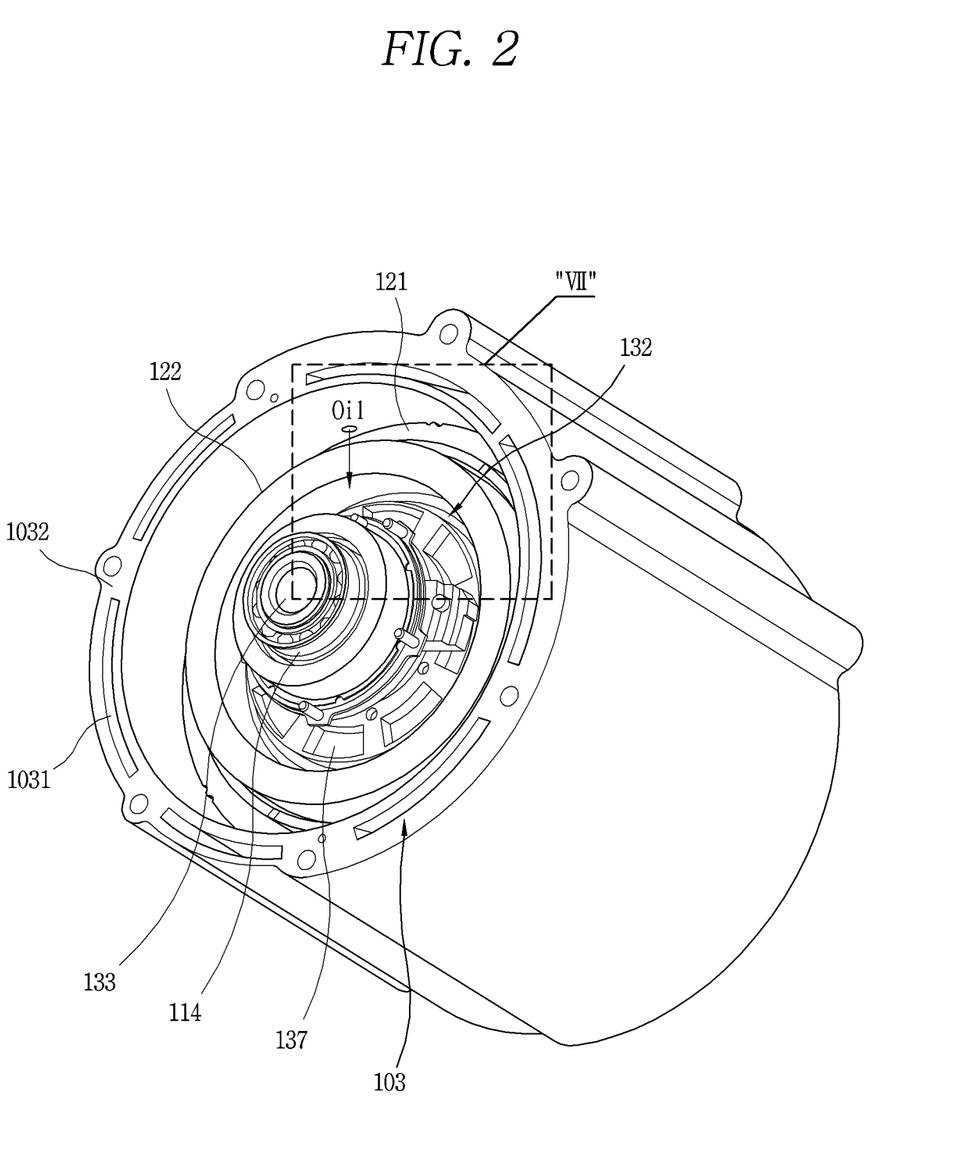
FIG. 2 is a conceptual view illustrating an end plate of a rotor after removing an end cover in FIG. 1.
Figure 3:
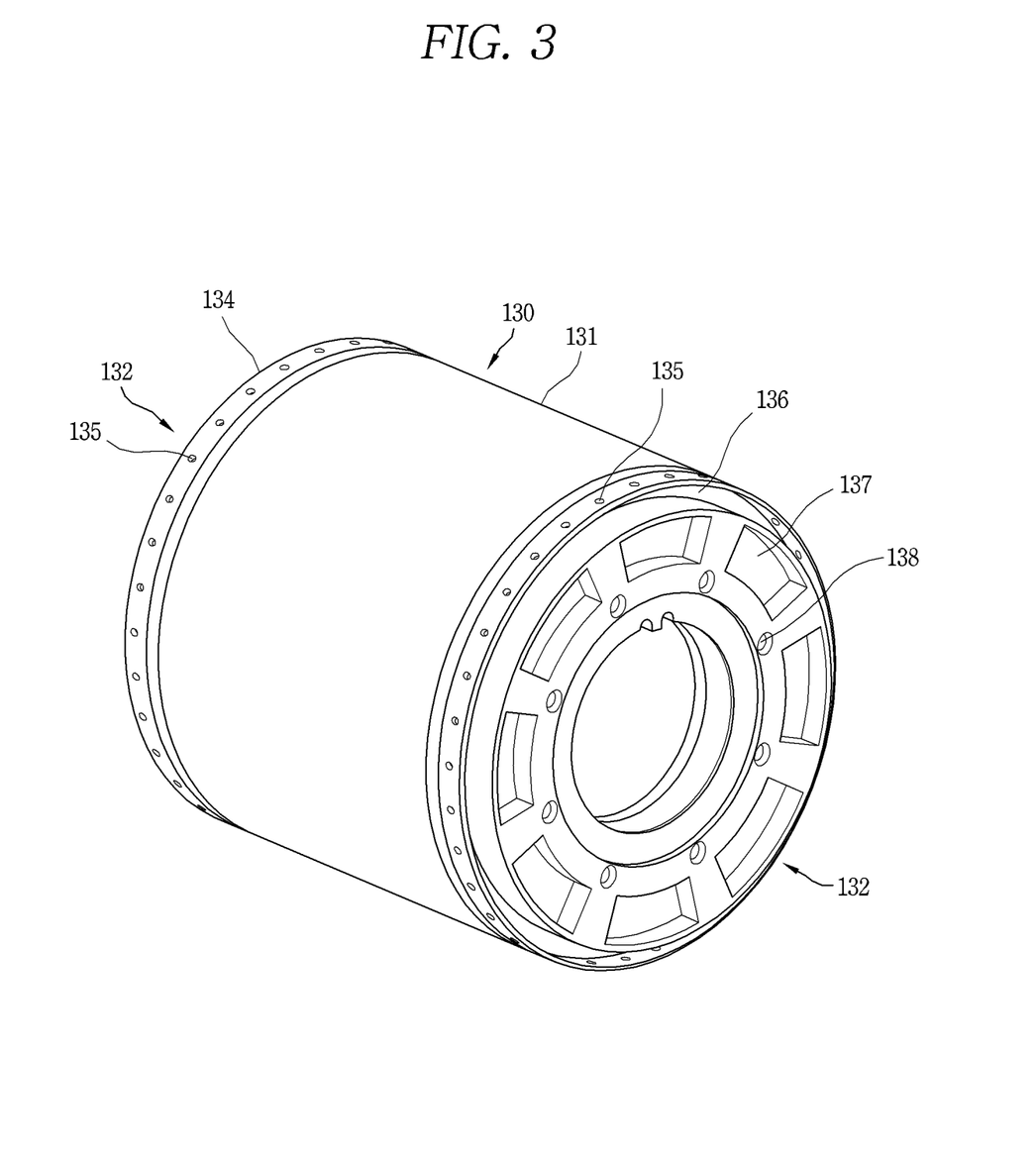
FIG. 3 is a conceptual view illustrating the rotor in FIG. 2.
Figure 4:
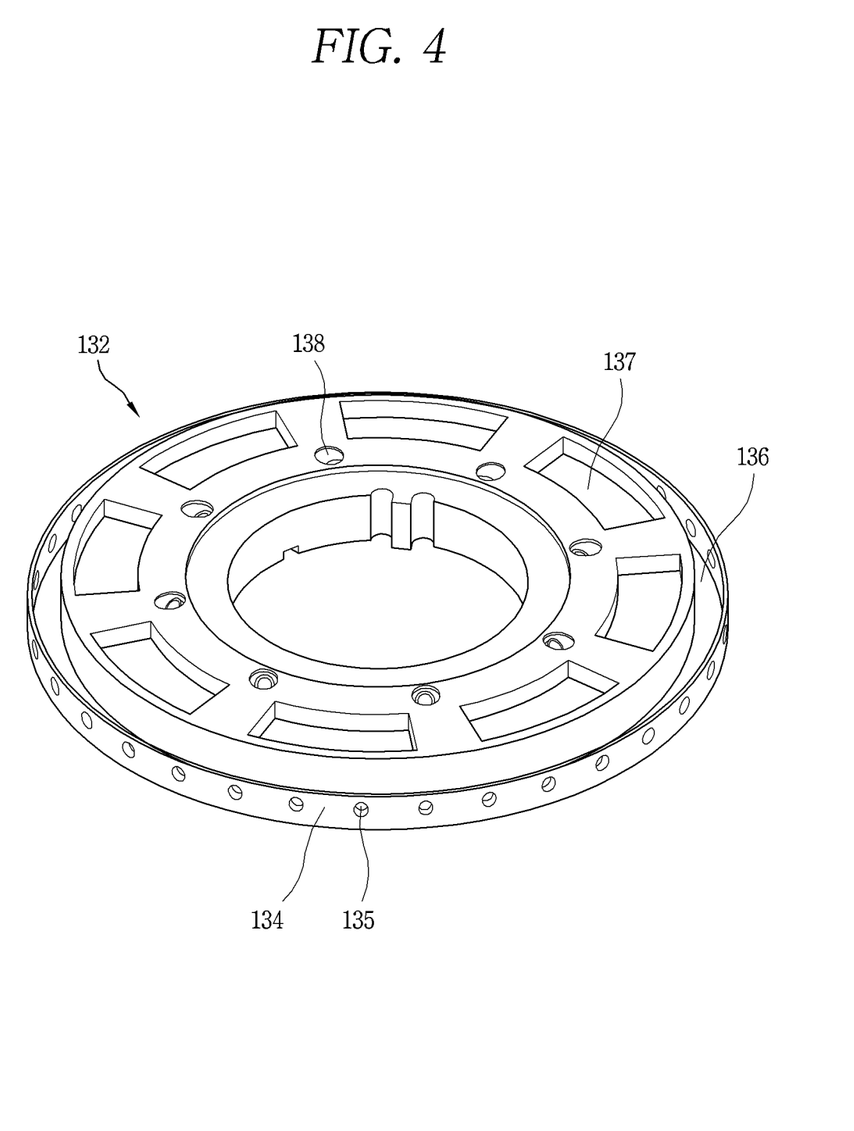
FIG. 4 is a perspective view illustrating the end plate in FIG. 3.
Figure 5:
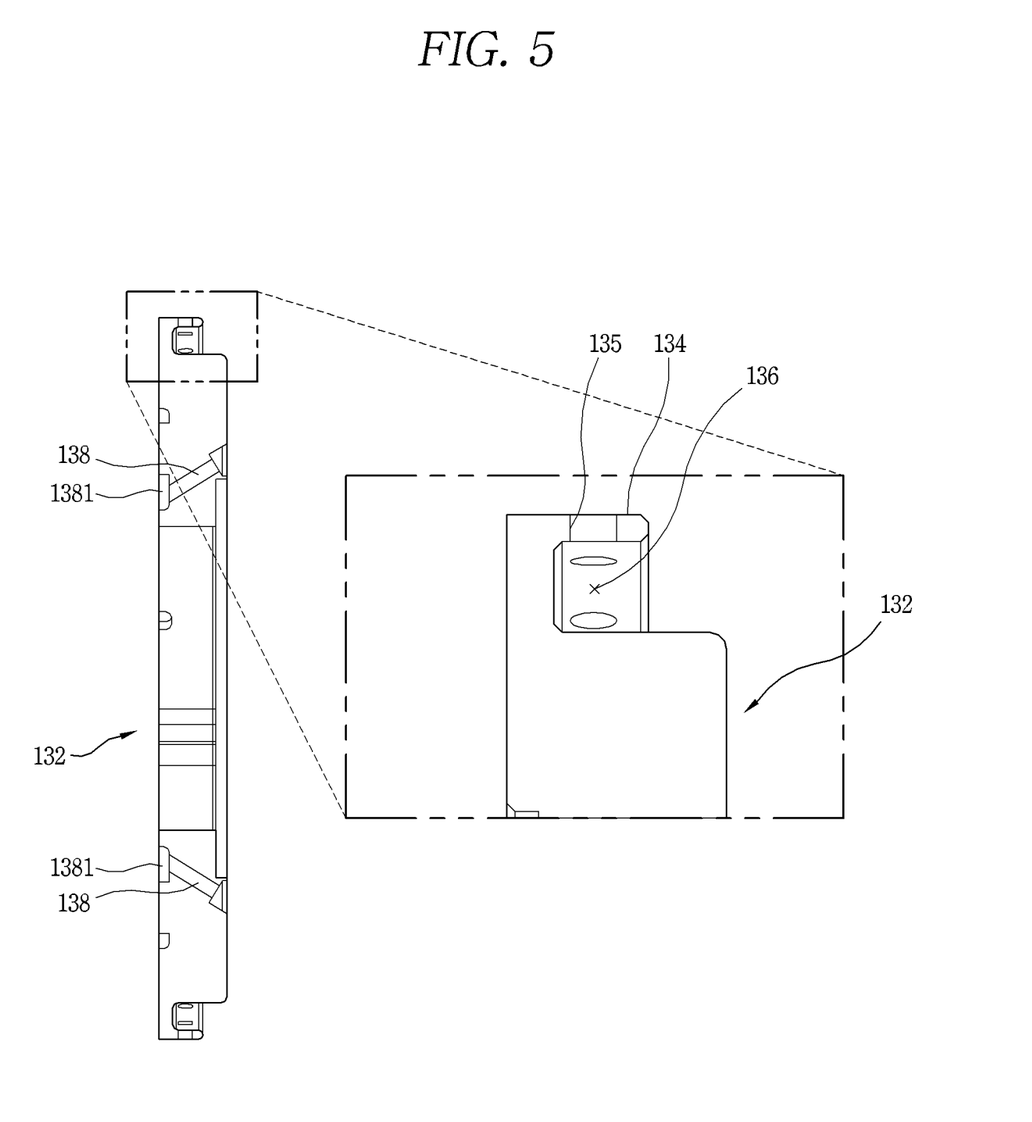
FIG. 5 is a sectional view taken along the line V-V of FIG. 4.
Figure 6:
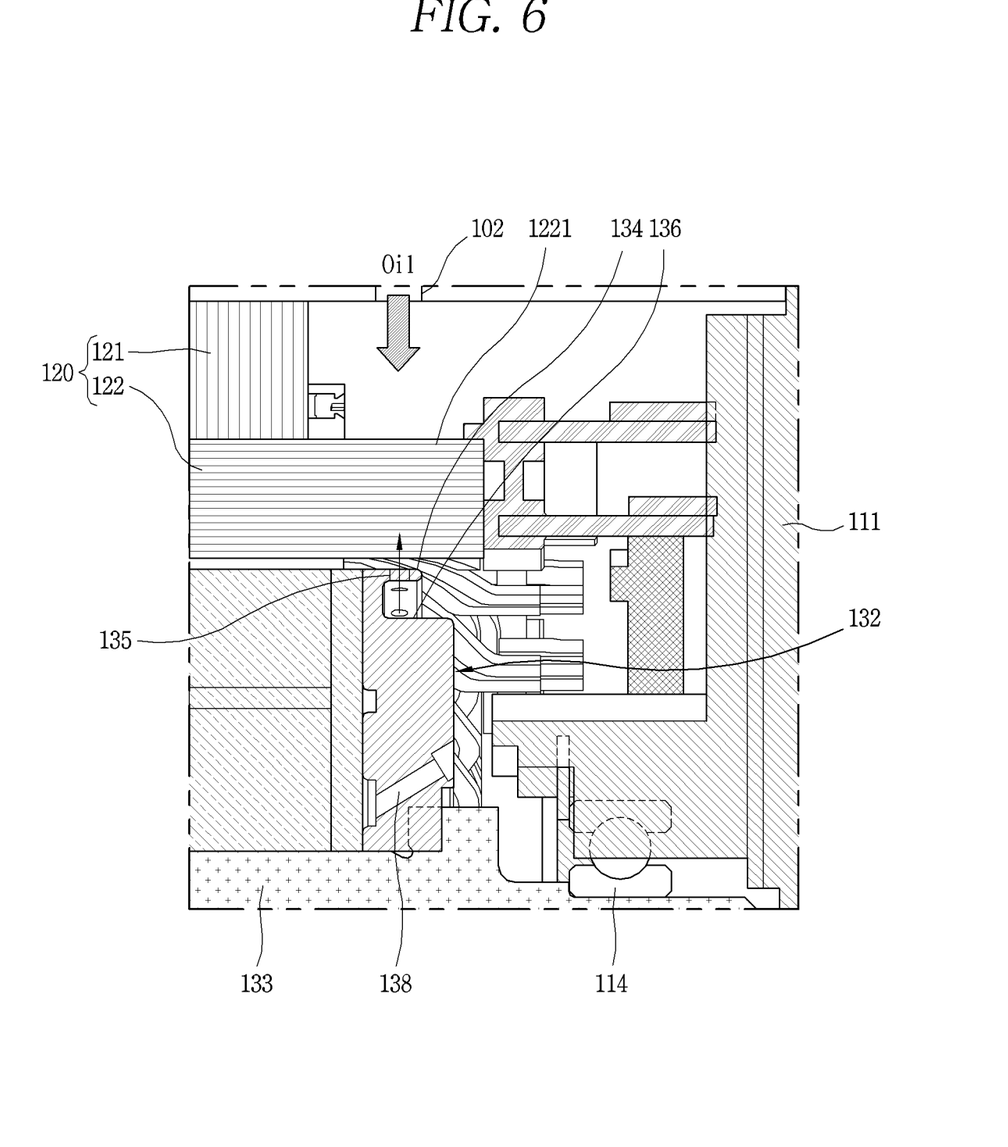
FIG. 6 is an enlarged view illustrating a part VI in FIG. 1.
Figure 7:
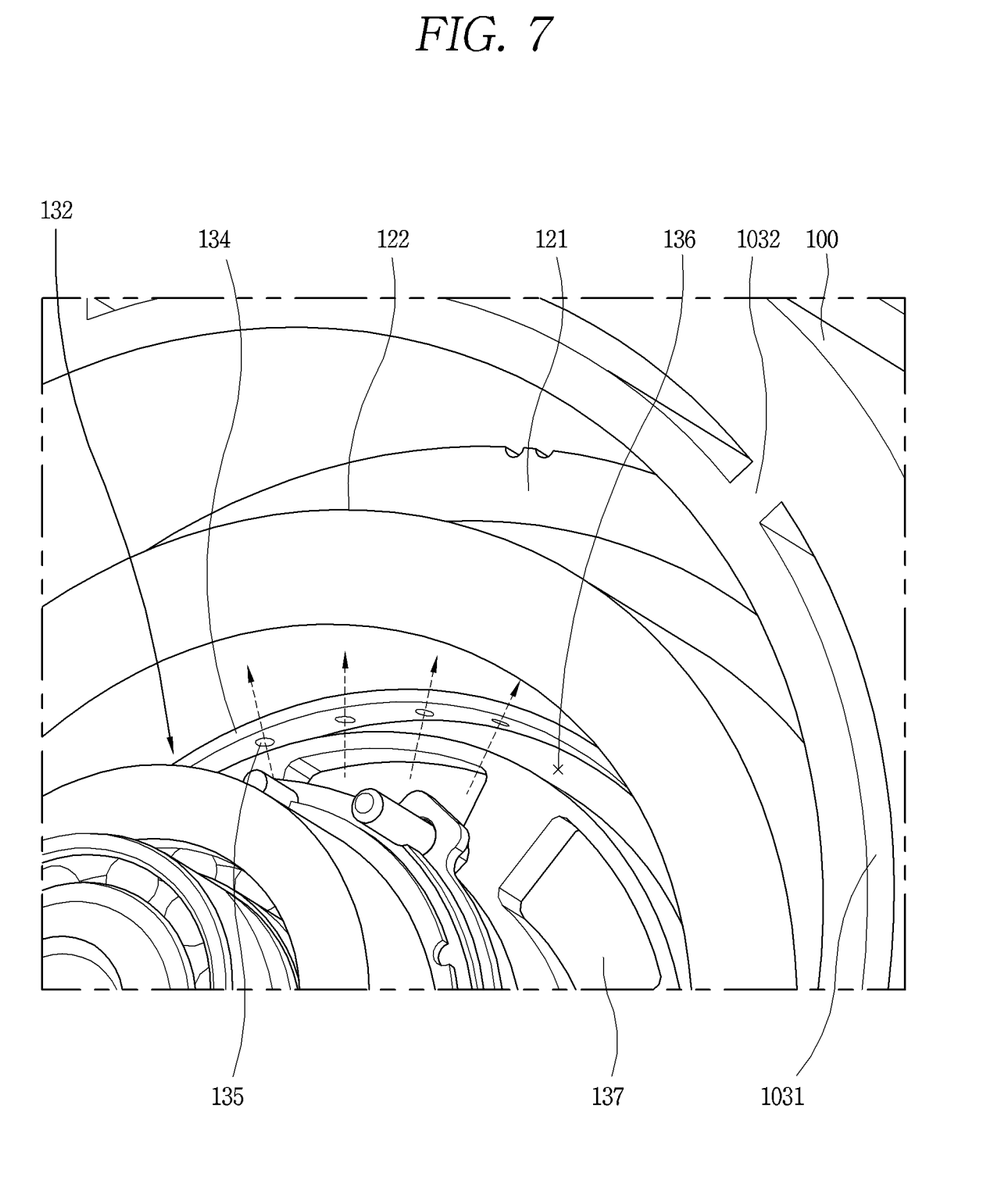
FIG. 7 is an enlarged view illustrating a part VII in FIG. 2.

FIG. 1 is a conceptual view of an electric motor in accordance with the present disclosure, FIG. 2 is a conceptual view illustrating an end plate 132 of a rotor 130 after removing an end cover 110 in FIG. 1, FIG. 3 is a conceptual view illustrating the rotor 130 in FIG. 2, FIG. 4 is a perspective view illustrating the end plate 132 in FIG. 3, FIG. 5 is a sectional view taken along the line V-V of FIG. 4, FIG. 6 is an enlarged view illustrating a part VI in FIG. 1, and FIG. 7 is an enlarged view illustrating a part VII in FIG. 2.

The electric motor according to the present disclosure may include a motor housing 100, end covers 110, a stator 120, and a rotor 130.

The motor housing 100 may be formed in a cylindrical shape. The motor housing 100 may define appearance of the electric motor. An accommodating space may be formed in the motor housing 100, so that an assembly of the stator 120 and the rotor 130 can be accommodated in the motor housing 100.

The motor housing 100 may be formed in a cylindrical shape. The motor housing 100 may have both end portions which are open in a lengthwise direction of its circumferential surface. The plurality of end covers 110 may be mounted to cover the both end portions of the motor housing 100.

The stator 120 may include a stator core 121 and a coil 122.

The stator core 121 may be formed by stacking a plurality of round steel plates in an axial direction. A rotor accommodation hole may be formed in a cylindrical shape through the inside of the stator core 121.

A plurality of slots may be formed through the inside of the stator core 121 in the axial direction, to be spaced apart from one another along a circumferential direction of the stator core 121. The coil 122 may be inserted into the slots and wound.

The coil 122 may be made up of conductors in the form of a hairpin, and both ends of the conductors protruding to the outside of the slots may be connected together. The both ends of the conductors protruding to the outside of the slots may be referred to as end coils 1221.

The stator core 121 may be coupled to the motor housing 100 in a manner that an outer circumferential surface is press-fitted onto an inner circumferential surface of the motor housing 100.

The rotor 130 may be mounted inside the motor housing 100 to be rotatable centering on a rotary shaft 133.

The end covers 110 may include a front cover 111 covering one end portion of the motor housing 100 and a rear cover 112 covering another end portion of the motor housing 100. The front cover 111 may be a cover through which the rotary shaft 133 is inserted. The rotary shaft 133 may not pass through the rear cover 112 but one end portion of the rotary shaft 133 may be accommodated in a bearing accommodating portion 113 of the rear cover 112.

Bearings 114 may be disposed inside central portions of the front cover 111 and the rear cover 112, respectively. The bearings 114 may rotatably support both end portions of the rotary shaft 133.

The rotor 130 may include a rotor core 131, a plurality of permanent magnets (not shown), and a plurality of end plates 132. The rotor core 131 may be formed by stacking a plurality of round steel plates in the axial direction. The rotor core 131 may be formed in a cylindrical shape.

The plurality of permanent magnets may be inserted into the rotor core 131.

The plurality of end plates 132 may be mounted to both ends of the rotor core 131 in a lengthwise direction of the rotor core 131, to prevent the permanent magnets accommodated in the rotor core 131 from being separated from the rotor core 131 in the axial direction. A shaft accommodating hole may be formed through a central portion of each end plate 132 in the axial direction, such that the rotary shaft 133 can be inserted therethrough.

A rotation shaft accommodating hole may be formed through a central portion of the rotor core 131 in the axial direction. The rotation shaft 133 may thusly be inserted into the rotor core 131 through the rotary shaft accommodating hole.

The rotor 130 may be disposed with an air gap from the stator 120. When power is applied to the coil 122, a magnetic field may be formed around the coil 122 and a rotating magnetic field may be formed in the permanent magnets. Accordingly, the rotor 130 may rotate.

The end plates 132 may be fastened to the rotor core 131. When the rotor 130 rotates, the end plates 132 may rotate centering on the rotary shaft 133 together with the rotor core 131.

An oil flow path 101 may be formed in the motor housing 100 to dissipate heat generated in the electric motor to the outside. The oil flow path 101 may include a plurality of heat exchange cells 1031 spaced apart from each other in the circumferential direction of the motor housing 100. The plurality of heat exchange cells 1031 may communicate with one another in a zigzag form in the circumferential direction.

An oil inlet may be formed in a lower portion of the motor housing 100 and an oil outlet 102 may be formed in an upper portion of the motor housing 100. One side of the oil flow path 101 may communicate with the oil inlet and another side of the oil flow path 101 may communicate with the oil outlet 102.

Oil may be introduced into the oil flow path 101 through the oil inlet, and flow along the oil flow path 101 toward the oil outlet 102. The oil may be sprayed onto an upper portion of an outer side of the coil 122 through the oil outlet 102.

An oil pump (not shown) may be mounted on a side surface of the motor housing 100 to be connected to the oil flow path 101, so that oil can be pumped to move from the oil inlet to the oil outlet 102 along the oil flow path 101.

The oil outlet 102 may be disposed in each of both ends of the motor housing 100 in the lengthwise direction of the motor housing 100. The oil outlet 102 may penetrate through the motor housing 100 in a thickness direction of the motor housing 100, such that one end communicates with the oil flow path 101 and another side communicates with the accommodation space of the motor housing 100.

Oil may be filled in the accommodating space of the motor housing 100 by a predetermined amount. Such oil may be introduced into the oil flow path 101 through the oil inlet so as to be circulated by circulation power of the oil pump along the oil flow path 101, and sprayed directly onto the coil 122 through the oil outlet 102, thereby cooling down the coil 122 by absorbing heat from the coil 122.

The oil sprayed onto the coil 122 through the oil outlet 102 may be dropped down onto an upper end of the outer circumferential surface of the end coil 1221 and move to both sides of the coil 122 in the circumferential direction.

The end plate 132 may be formed to have the same size as the outer circumferential surface of the rotor core 131, and provided with at least one spray hole 135 formed through its outer circumferential surface. In the implementation of the present disclosure, the at least one spray hole 135 may be provided in plurality spaced apart from one another in the circumferential direction.

A rib 134 may extend in a ring shape from the outer circumferential surface of each end plate 132 along the circumferential direction. The plurality of spray holes 135 may be formed through the rib 134 in a thickness direction of the rib 134. The plurality of spray holes 135 may be formed through the end plate 132 in a radial direction of the end plate 132.

The end plate 132 may further include a cooling fluid accommodating portion 136. The cooling fluid accommodating portion 136 may be disposed at an inner side of the rib 134 in the radial direction of the end plate 132. The cooling fluid accommodating portion 136 may be formed concavely in the axial direction and a thickness direction of the end plate 132.

The cooling fluid accommodating portion 136 may be closed at its axial thickness surface toward the rotor core 131 and opened toward the end cover 110. The cooling fluid accommodating portion 136 may be formed in the form of a "U"-shaped groove laid down in one direction to be open toward the end cover 110.

Accordingly, the oil filled in the lower portion of the motor housing 100 may be easily introduced into the cooling fluid accommodating portion 136.

Each of the plurality of spray holes 135 may be formed such that its radial outer side communicates with an inner surface of the coil 122 and its radial inner side communicates with the cooling fluid accommodating portion 136.

The rib 134 may be formed such that a length protruding in the axial direction from the outer circumferential surface of the end plate 132 is shorter than a thickness of the end plate 132 in the axial direction.

A radially inner end of the cooling fluid accommodating portion 136 may more protrude in the axial direction than a radially outer end of the cooling fluid accommodating portion 136 (or an axial protrusion length of the rib 134).

With the configuration, the rib 134 may guide oil, which falls from an upper portion of the radially inner side of the coil 122 onto the outer circumferential surface of the end plate 132, to be introduced into the cooling fluid accommodating portion 136 and may keep the oil in the cooling fluid accommodating portion 136.

The plurality of spray holes 135 formed through the rib 134 may accommodate oil in a state immersed in the oil stored in the lower portion of the motor housing 100, and rotate in response to the rotation of the rotor 130 to pump the accommodated oil into the upper portion of the motor housing 100. The oil may then be sprayed onto the coil 122 from the upper portion of the end plate 132 through the spray holes 135 by a centrifugal force.

During the rotation of the rotor 130, the oil introduced into the spray holes 135 or the cooling fluid accommodating portion 136 may be sprayed onto the inner surface of the coil 122 by the centrifugal force through the plurality of spray holes 135, thereby cooling down the inner surface of the coil 122.

In addition, the rib 134 formed on the outer circumferential surface of the rotor 130 may be provided with a plurality of spray holes 135 along its circumferential surface, so as to generate a flow that the oil stored in the motor housing 100 is pumped from the lower portion to the upper portion of the motor housing 100, thereby facilitating convection cooling of the oil.

Also, the rib 134 extending from the outer circumferential surface of each end plate 132 in the circumferential direction, the plurality of spray holes 135 formed through the rib 134 in the radial direction, and the cooling fluid accommodating portion 136 concavely formed in the outer surface of the end plate 132 in the circumferential direction may minimize flow resistance due to the oil even though such components are rotated in the state immersed in the oil when the rotor 130 rotates.

The end plate 132 may be provided with a plurality of recesses 137 formed in the outer surface of the end plate 132 facing the end cover 110 between the rotary shaft accommodating hole and the cooling fluid accommodating portion 136. The plurality of recesses 137 may be concave in the thickness direction. The plurality of recesses 137 may be spaced apart from one another in the circumferential direction.

Each of the plurality of recesses 137 may be formed in a fan shape. In each of the plurality of recesses 137, two inner surfaces facing each other in the radial direction may extend in parallel to each other, and two inner surfaces facing each other in the circumferential direction may form a preset angle in the circumferential direction of the end plate 132.

Each of the plurality of recesses 137 may accommodate oil to generate a turbulent flow of the oil in the motor housing 100.

With this configuration, the plurality of recesses 137 may reflect the accommodated oil to the inner space of the motor housing 100 when the rotor 130 rotates, thereby facilitating convection cooling of the oil inside the motor housing 100.

Each of the plurality of end plates 132 may further include a plurality of oil injection nozzles 138.

The plurality of oil injection nozzles 138 may be configured to spray oil from the end plate 132 toward the end cover 110. The plurality of oil injection nozzles 138 may be spaced apart from one another in the circumferential direction.

Each of the oil injection nozzles 138 may be formed such that an inner end portion communicates with an inner flow path 142 for circulating oil in the rotor core 131 and an outer end portion communicates with the accommodation space of the motor housing 100.

The oil injection nozzles 138 each may be formed to be inclined upward from the inner end portion to the outer end portion. Each of the plurality of oil injection nozzles 138 may spray oil toward the inside of the bearing accommodating portion 113, so as to cool down the bearing 114.

An oil accommodating groove 139 may be formed in the rotary shaft 133. The oil accommodating groove 139 may extend into a central portion of the rotary shaft 133 in the axial direction. An inner end of the oil accommodating groove 139 may be blocked and an outer end of the oil accommodating groove 139 may be open to communicate with the inside of the bearing accommodating portion 113, such that oil can be introduced into the oil accommodating groove 139 from the inside of the bearing accommodating portion 113.

A plurality of radial flow paths 141 may extend radially from an inner central portion of the rotor core 131. Each of the plurality of radial flow paths 141 may be configured such that its inner end portion in the radial direction communicates with the oil accommodating groove 139.

The plurality of radial flow paths 141 may be spaced apart from one another in the axial direction.

The rotary shaft 133 may include a plurality of communication holes 140 communicating with the oil accommodating groove 139. The plurality of communication holes 140 may be formed through the rotary shaft 133 in the radial direction. Inner end portions of the plurality of communication holes 140 may communicate with the oil accommodating groove 139 and outer end portions may communicate with the plurality of radial flow paths 141.

A plurality of inner flow paths 142 may extend in the axial direction inside the rotor core 131. Each of the inner flow paths 142 may be formed such that one end portion is connected to an outer end portion of the radial flow path 141 and another end portion communicates with an oil header to be explained later.

With this configuration, oil may be introduced into the oil accommodating groove 139 from the bearing accommodating portion 113, and flow from the inner end portion of the oil accommodating groove 139 to the radial flow paths 141 through the communication holes 140 by the centrifugal force of the rotary shaft 133. The oil may then flow into the plurality of oil injection nozzles 138 of the end plate 132 in the axial direction along the inner flow paths 142 via the radial flow paths 141.

An oil header 1381 extending in the circumferential direction may be concavely formed in an inner end portion of each of the plurality of oil injection nozzles 138 to collect oil from the inner flow path 142. The oil collected in the oil headers 1381 may be distributed to the plurality of oil injection nozzles 138, so as to be sprayed to the bearing accommodating portion 113 through the oil injection nozzles 138.

A cooling water flow path 103 may further be provided in the motor housing 100. The cooling water flow path 103 may be configured by a plurality of heat exchange cells 1031. The plurality of heat exchange cells 1031 may be spaced apart from one another in the circumferential direction by a plurality of partition walls 1032.

Connection holes may be formed in front or rear end portions of the plurality of partition walls 1032, respectively, such that the plurality of heat exchange cells 1031 can be connected in a zigzag shape in the circumferential direction. The cooling water flow path 103 and the oil flow path 101 may be disposed in the motor housing 100 to exchange heat with each other.

For example, the cooling water flow path 103 and the oil flow path 101 may be concentrically disposed inside the motor housing 100, and may be disposed at an inner side and an outer side of the motor housing 100 in the thickness direction of the motor housing 100.

A cooling water inlet and a cooling water outlet may be formed in one side of the motor housing 100 to be connected to a radiator of a vehicle.

After cooled down by emitting heat through heat exchange with external air in the radiator of the vehicle, the cooling water may flow into the cooling water flow path 103 in the motor housing 100 through the cooling water inlet. While flowing along the cooling water flow path 103, the cooling water may cool down the oil in the oil flow path 101 through heat exchange with the oil. The cooling water may then be discharged through the cooling water outlet and circulate to the radiator.

A cooling water flow path 115 may further be formed in each of the end covers 110. The cooling water flow path 115 of the end cover 110 may communicate with the cooling water flow path 103 of the motor housing 100 or may be formed as a separate flow path from the motor housing 100. When the cooling water flow path 115 of the end cover 110 is formed as a flow path separate from the motor housing 100, a cooling water inlet and a cooling water outlet may also be formed in the end cover 110.

Figure 8:
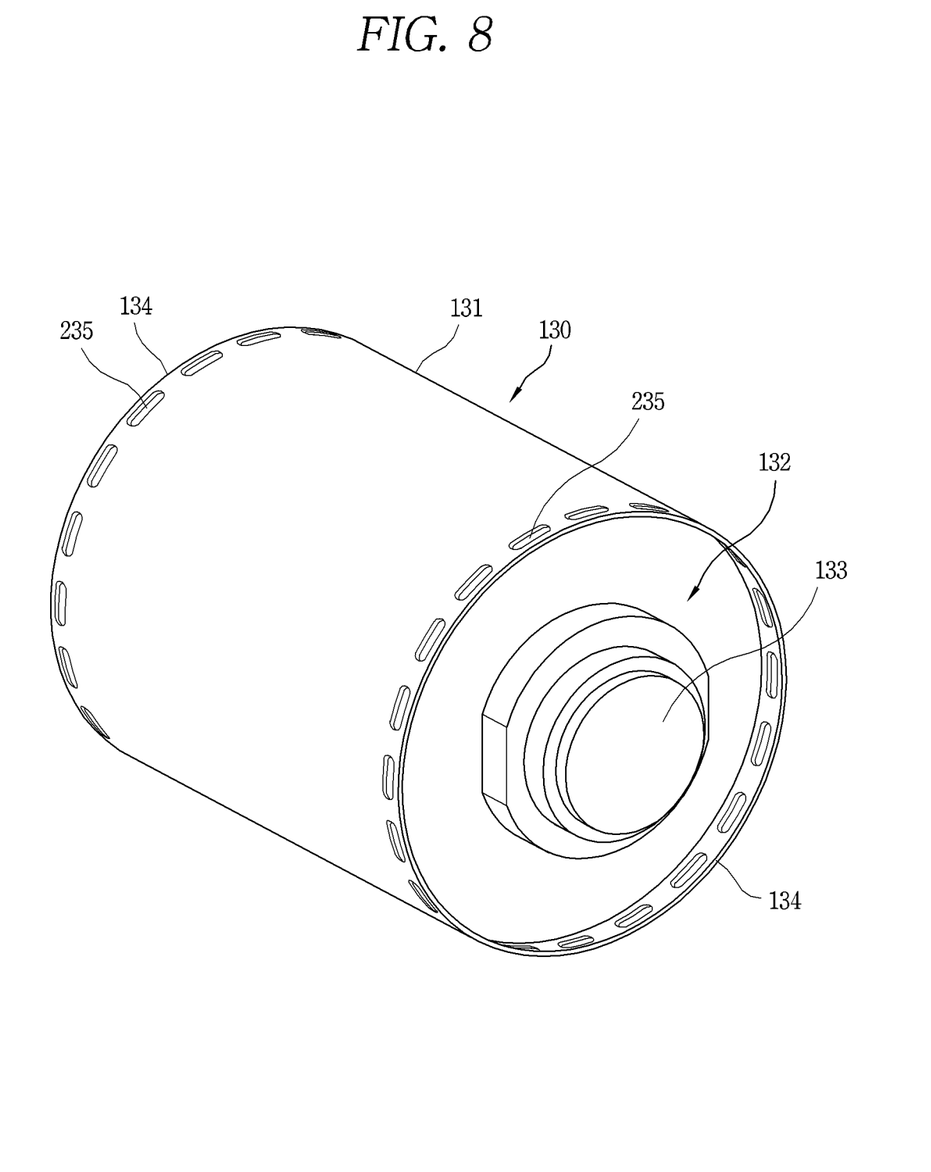
FIG. 8 is a conceptual view illustrating a state in which a plurality of spray holes is formed in an elliptical shape through a circumferential surface of a rotor in accordance with another implementation of the present disclosure.
Figure 9:
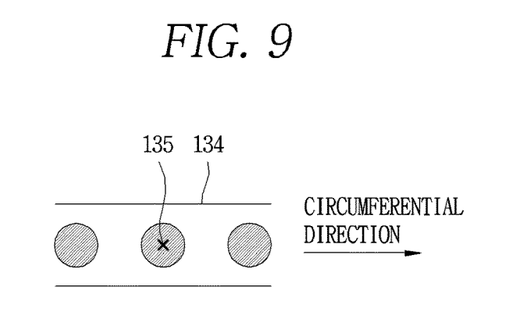
FIG. 9 is a conceptual view illustrating a state in which the plurality of spray holes is formed in a circular shape.
Figure 10:
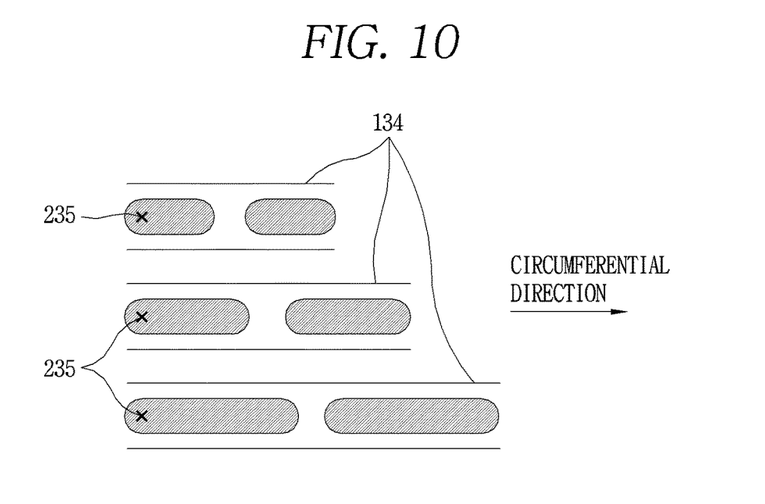
FIG. 10 is a conceptual view illustrating a state in which the plurality of spray holes in FIG. 8 extends in a circumferential direction by different lengths.
Figure 11:
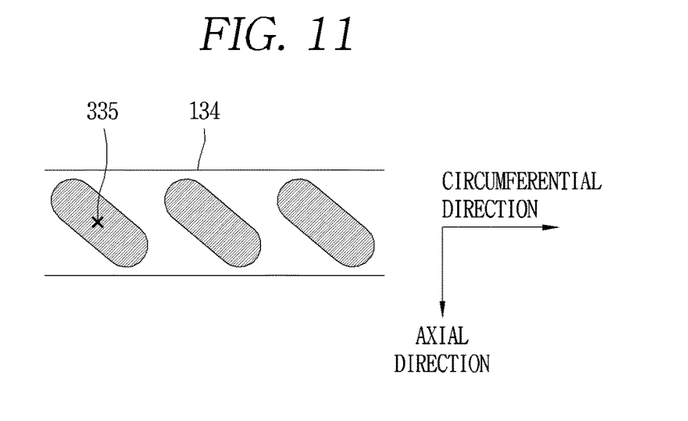
FIG. 11 is a conceptual view illustrating a state in which the plurality of spray holes extends in an oblique direction.

FIG. 8 is a conceptual view illustrating a state in which a plurality of spray holes 235 is formed in an elliptical shape through the circumferential surface of the rotor 130 in accordance with another implementation of the present disclosure, FIG. 9 is a conceptual view illustrating a state in which the plurality of spray holes 135 is formed in a circular shape, FIG. 10 is a conceptual view illustrating a state in which the plurality of spray holes 235 in FIG. 8 extends in a circumferential direction by different lengths, and FIG. 11 is a conceptual view illustrating a state in which the plurality of spray holes 235 extends in an oblique direction.

The plurality of spray holes 135, 235, 335 may be disposed in both end portions of the outer circumferential surface of the rotor 130 in the lengthwise direction of the rotor 130 to be spaced apart from one another in the circumferential direction. The plurality of spray holes 135, 235, 335 may be disposed in the outer circumferential surface of the end plate 132 to be spaced apart from one another along the circumferential direction. The plurality of spray holes 135, 235, 335 may be disposed in the rib 134 extending from the outer circumferential surface of the end plate 132 to be spaced apart from one another in the circumferential direction.

Each of the plurality of spray holes 135, 235, 335 may be formed in a circular or elliptical shape. In the implementation of FIG. 9, the spray hole 135 may be formed in a circular shape. On the other hand, in the implementations of FIGS. 8 and 10, the spray hole 235 may be formed in an elliptical shape.

The elliptical spray hole 235 means that the spray hole 135 extends long in the circumferential direction with a constant width and has both ends formed in a semicircular shape.

As illustrated in FIG. 10, each of the plurality of spray holes 235 may extend by a preset first length. Each of the plurality of spray holes 235 may extend by a second length longer than the first length. Each of the plurality of spray holes 235 may extend by a third length longer than the second length.

Alternatively, the plurality of spray holes 235 may be configured by a combination of at least two of spray holes 235 having the first to third lengths.

As illustrated in FIG. 11, the plurality of spray holes 335 may extend in an oblique direction. The oblique direction means that the spray holes are inclined toward the circumferential direction with respect to the axial direction.

The plurality of spray holes 335 extending in the oblique direction may be spaced apart from one another at equal intervals in the circumferential direction of the rib 134.

What is claimed is:

1. A motor comprising:
   a motor housing;
   a stator provided inside the motor housing and having a coil;
   a rotor provided with a rotor core and a plurality of end plates mounted on both ends of the rotor core, respectively, the rotor mounted inside the stator to be rotatable centering on a rotary shaft; and
   a plurality of end covers mounted to cover both end portions of the motor housing,
   wherein each of the plurality of end plates comprises:
      a rib extending in a ring shape from an outer circumferential surface;
      a plurality of spray holes formed through a circumferential surface of the rib in a radial direction to spray a cooling fluid inside the motor housing onto the coil in response to rotation of the rotor; and
      a cooling fluid accommodating portion disposed at an inner side of the rib in the radial direction to communicate with the spray holes, the cooling fluid accommodating portion formed concavely in a thickness direction of the end plate and opened toward the end cover, and
   wherein an axial protrusion length of the rib protruding in an axial direction from the outer circumferential surface of the end plate is shorter than an axial thickness of the end plate.

2. The motor of claim 1, wherein the cooling fluid is oil or air.

3. The motor of claim 1, wherein the plurality of spray holes is formed through the rib in a thickness direction of the rib.

4. The motor of claim 1, wherein the cooling fluid is oil, and
   wherein the cooling fluid accommodating portion is formed such that a part of an outer end portion is covered by the rib and oil dropped down from an inner side of the coil is accommodated through another part of the outer end portion opened from the rib.

5. The motor of claim 1, wherein the plurality of end covers is disposed on both ends of the motor housing, and
   wherein the cooling fluid accommodating portion extends in a circumferential direction of the end plate.

6. The motor of claim 1, wherein the cooling fluid is sprayed to an inner side of the coil from an outer circumferential surface of the rotor through the plurality of spray holes.

7. The motor of claim 1, wherein the plurality of spray holes is formed in a circular shape or an elliptical shape.

8. The motor of claim 1, wherein the plurality of spray holes is disposed at both end portions of a circumferential surface of the rotor to be spaced apart from one another in a circumferential direction.

9. The motor of claim 1, wherein each of the plurality of spray holes extends in a circumferential direction to be longer than a width thereof.

10. The motor of claim 1, wherein the plurality of spray holes extends long in an oblique direction.

11. The motor of claim 1, further comprising:
an oil flow path formed inside the motor housing; and
an oil outlet formed in an upper portion of the motor housing in a thickness direction and having both ends communicating with the oil flow path and an inner space of the motor housing, respectively, such that oil is supplied to the coil.

12. The motor of claim 1, wherein each of the plurality of end covers is provided with a bearing accommodating portion, and
wherein each of the plurality of end plates comprises:
a plurality of oil injection nozzles disposed inside the cooling fluid accommodating portion to spray oil transferred from an inner flow path formed in the rotor core to the bearing accommodating portion; and
oil headers extending in a circumferential direction from one surface of the end plate to connect the inner flow path and one end portion of each of the oil injection nozzles so as to distribute the oil into the plurality of oil injection nozzles.

* * * * *